US012551051B2

(12) United States Patent
Guyon

(10) Patent No.: US 12,551,051 B2
(45) Date of Patent: Feb. 17, 2026

(54) BEVERAGE PREPARATION MACHINE WITH CAPSULE RECOGNITION

(71) Applicant: SOCIETE DES PRODUITS NESTLE S.A., Vevey (CH)

(72) Inventor: Bertrand Guyon, Pontarlier (FR)

(73) Assignee: Societe des Produits Nestle S.A., Vevey (CH)

( * ) Notice: Subject to any disclaimer, the term of this patent is extended or adjusted under 35 U.S.C. 154(b) by 829 days.

(21) Appl. No.: 17/760,074

(22) PCT Filed: Feb. 3, 2021

(86) PCT No.: PCT/EP2021/052457
§ 371 (c)(1),
(2) Date: Aug. 3, 2022

(87) PCT Pub. No.: WO2021/156268
PCT Pub. Date: Aug. 12, 2021

(65) Prior Publication Data
US 2023/0066001 A1  Mar. 2, 2023

(30) Foreign Application Priority Data
Feb. 5, 2020 (EP) ..................... 20155754

(51) Int. Cl.
*A47J 31/44* (2006.01)
*A47J 31/36* (2006.01)

(52) U.S. Cl.
CPC ....... *A47J 31/4492* (2013.01); *A47J 31/3676* (2013.01)

(58) Field of Classification Search
CPC ............... A47J 31/4492; A47J 31/3623; A47J 31/3633; A47J 31/3676
(Continued)

(56) References Cited

U.S. PATENT DOCUMENTS

| | | |
|---|---|---|
| 7,907,061 B2 | 3/2011 | Lin et al. |
| 8,222,591 B2 | 7/2012 | Lin |
| 2022/0330742 A1* | 10/2022 | Ioannidis ............ A47J 31/4492 |

FOREIGN PATENT DOCUMENTS

| | | |
|---|---|---|
| DE | 102014109768 A1 | 1/2016 |
| EP | 1786303 B1 | 4/2008 |

(Continued)

OTHER PUBLICATIONS

Japanese Office Action for Appl No. 2022-545935 dated Sep. 6, 2024, 10 pages.

(Continued)

*Primary Examiner* — Reginald Alexander
(74) *Attorney, Agent, or Firm* — K&L Gates LLP

(57) ABSTRACT

Machine (1) for preparing and dispensing a beverage (2), such as tea, coffee, hot chocolate, cold chocolate, milk, soup or baby food, wherein the machine comprises a capsule recognition module (8) for recognizing a type of a capsule (3) inserted in the machine (1), the capsule recognition module (8) comprising a light source (82) for lighting at least part of the surface of the capsule (3) and an optical sensor (81) for sensing an optical property of the at least part of the surface of the capsule (3); and wherein the capsule recognition module (8) is configured to: determine a correction value of the optical property by sensing the optical property of the at least part of the surface of the capsule (3) while said light source (82) is switched off; determine at least one sample value of the optical property by sensing the optical property of the at least part of the surface of the capsule (3) while the light source (82) is switched on; calculate a corrected sample value with the correction value and the at least one sample value; determine a type of the capsule by comparing the corrected sample value with at (Continued)

least one reference value, the at least one reference value being representative of a type of capsule.

14 Claims, 7 Drawing Sheets

(58) Field of Classification Search
USPC .......................................... 99/280, 285, 295
See application file for complete search history.

(56) References Cited

FOREIGN PATENT DOCUMENTS

| | | |
|---|---|---|
| EP | 3017734 A1 | 5/2016 |
| EP | 3019059 B1 | 8/2017 |
| EP | 3873829 B1 | 8/2023 |
| JP | 2016090530 A | 5/2016 |
| JP | 2017104491 A | 6/2017 |
| JP | 2018092007 A | 6/2018 |
| RU | 2614092 C2 | 3/2017 |
| WO | 2012123440 | 9/2012 |
| WO | 2018220510 | 12/2018 |
| WO | 2018229102 A1 | 12/2018 |
| WO | 2020152053 A1 | 7/2020 |

OTHER PUBLICATIONS

Russian Office Action for Appl No. 2022121896/03 dated Jun. 3, 2024, 7 pages.
"Farbsensor" Wikipedia, Retrieved from <https://de.wikipedia.org/wiki/Farbsensor>, pp. 1-3.
"Conex-PSD Ambient Light Compensation", Newport, 1 Page.
"Moving Average", Wikipedia, Retrieved from <https://de.wikipedia.org/w/index.php?title=Gleitender_Mittelwert&oldid=194052529>, pp. 1-6.
"Gleitender Mittelwert", Wikipedia, Retrieved from <https://de.wikipedia.org/w/index.php?title=Gleitender_Mittelwert&oldid=194052529>, pp. 1-6.
"Gleitender Mittelwert", p. 15.
"Signal Smoothing", Matlab & Simulink, pp. 1-7.
European Office Action for Appl No. 21702037.9-1015 dated Apr. 28, 2025, 31 pages.
Japanese Office Action for Appl No. 2022-545935 dated Jul. 1, 2025, 3 pages.

* cited by examiner

BEVERAGE PREPARATION MACHINE WITH CAPSULE RECOGNITION

CROSS REFERENCE TO RELATED APPLICATIONS

The present application is a National Stage of International Application No. PCT/EP2021/052457, filed on Feb. 3, 2021, which claims priority to European Patent Application No. 20155754.3, filed on Feb. 5, 2020, the entire contents of which are being incorporated herein by reference.

FIELD OF THE INVENTION

The field of the invention pertains to beverage preparation machines using capsules of an ingredient of the beverage to be prepared. The field of the invention pertains in particular to beverage preparation machines using capsules and configured to automatically recognize a type of a capsule inserted in the machine in order for example to adapt the beverage preparation parameters to the recognized capsule type.

For the purpose of the present description, a "beverage" is meant to include any human-consumable liquid substance, such as tea, coffee, hot or cold chocolate, milk, soup, baby food, etc. A "capsule" is meant to include any pre-portioned beverage ingredient, such as a flavouring ingredient, within an enclosing packaging of any material, in particular an airtight packaging, e.g. plastic, aluminium, recyclable and/or biodegradable packagings, and of any shape and structure, including soft pods or rigid cartridges containing the ingredient. The capsule may contain an amount of ingredient for preparing a single beverage portion or a plurality of beverage portions.

BACKGROUND ART

Certain beverage preparation machines use capsules containing ingredients to be extracted or to be dissolved and/or ingredients that are stored and dosed automatically in the machine or else are added at the time of preparation of the drink. Some beverage machines possess filling means that include a pump for liquid, usually water, which pumps the liquid from a source of water that is cold or indeed heated through heating means, e.g. a thermoblock or the like.

Especially in the field of coffee preparation, machines have been widely developed in which a capsule containing beverage ingredients is inserted in a brewing device.

Brewing devices have been developed to facilitate insertion of a "fresh" capsule and removal of the capsule upon use. Typically, the brewing devices comprise two parts relatively movable from a configuration for inserting/removing a capsule to a configuration for brewing the ingredient in the capsule.

The actuation of the movable part of the brewing device may be manual as disclosed in WO 2009/043630, WO 01/15581, WO 02/43541, WO 2010/015427, WO 2010/128109, WO 2011/144719 and WO 2012/032019. Various handle configurations are disclosed in EP 1867260, WO 2005/004683, WO 2007/135136, WO 2008/138710, WO 2009/074550, WO 2009/074553, WO 2009/074555, WO 2009/074557, WO 2009/074559, WO 2010/037806, WO 2011/042400, WO 2011/042401 and WO 2011/144720. Integrations of such arrangements into beverage machines are disclosed in WO 2009/074550, WO 2011/144719, EP2014195046, EP2014195048 and EP2014195067.

The actuation of the movable part of the brewing device may be motorized. Such a system is for example disclosed in EP 1 767 129. In this case, the user does not have to provide any manual effort to open or close the brewing device. The brewing device has a capsule insertion passage provided with a safety door assembled to the movable part of the brewing device via a switch for detecting an undesired presence of a finger in the passage during closure and prevent injuries by squeezing. Alternative covers for a capsule insertion passage are disclosed WO 2012/093107 and WO 2013/127906. Different motorization systems are disclosed in WO 2012/025258, WO 2012/025259 and WO 2013/127476.

For allowing the user to interact with such machines, for providing operation instructions to the machine or obtaining feed-back therefrom, various systems have been disclosed in the art, for instance as mentioned in the following references: AT 410 377, CH 682 798, DE 44 29 353, DE 202 00 419, DE 20 2006 019 039, DE 2007 008 590, EP 1 448 084, EP 1 676 509, EP 08155851.2, FR 2 624 844, GB 2 397 510, U.S. Pat. Nos. 4,377,049, 4,458,735, 4,554,419, 4,767,632, 4,954,697, 5,312,020, 5,335,705, 5,372,061, 5,375,508, 5,645,230, 5,685,435, 5,731,981, 5,836,236, 5,959,869, 6,182,555, 6,354,341, 6,759,072, US 2007/0157820, WO 97/25634, WO 99/50172, WO 2004/030435, WO 2004/030438, WO 2006/063645, WO 2006/090183, WO 2007/003062, WO 2007/003990, WO 2008/104751, WO 2008/138710, WO 2008/138820, WO 2010/003932, WO 2011/144720 and WO 2012/032019.

To facilitate the operating of the machine, it is possible to identify automatically the capsule supplied to the machine and then handle and extract the capsule automatically, as for instance disclosed in WO 2012/123440.

There is still a need to improve the beverage dispensing with machines that reliably identify capsules automatically.

SUMMARY OF THE INVENTION

The invention relates to a machine for preparing a beverage. The beverage preparation machine can be an in-home or out of home machine.

The machine may be for the preparation of coffee, tea, chocolate, cacao, milk, soup, baby food, etc.

The beverage preparation typically includes the mixing of a plurality of beverage ingredients, e.g. water and milk powder, and/or the infusion or brewing of a beverage ingredient, such as an infusion or brewing of ground coffee or tea with water. One or more of such ingredients may be supplied in loose and/or agglomerate powder form and/or in liquid form, in particular in a concentrate form. A carrier or diluents liquid, e.g. water, may be mixed with such ingredient to form the beverage. Typically, a predetermined amount of beverage is formed and dispensed on user-request, which corresponds to a portion (e.g. a serving). The volume of such portion may be in the range of 25 to 200 ml and even up to 300 or 400 ml, e.g. the volume for filling a cup, depending on the type of beverage. Formed and dispensed beverages may be selected from ristrettos, espressos, lungos, cappuccinos, latte macchiato, café latte, americano coffees, teas, etc. In particular, a coffee machine may be configured for dispensing espressos, e.g. an adjustable volume of 20 to 60 ml per portion, and/or for dispensing lungos, e.g. a volume in the range of 70 to 150 ml per portion.

The machine of the invention has a unit for extracting a beverage ingredient capsule to form the beverage. The unit has a first part and a second part that are relatively movable between an open position for inserting and/or removing a capsule and a closed position for securing and extracting such capsule. In the closed position the first and second parts typically delimit an extraction chamber.

The capsule can comprise a capsule body, e.g. a generally straight or tapered body. The capsule can have a circular peripheral annulus flange, e.g. a flexible or rigid flange, extending from a peripheral part, e.g. an edge or face, of the capsule body. The capsule may contain a flavoring ingredient for preparing tea, coffee, hot chocolate, cold chocolate, milk, soup or baby food.

At least one part of the first and second parts may delimit a cavity for receiving the ingredient e.g. within a capsule, such as a tapered cavity, e.g. a conical or pyramidal cavity, or a straight cavity, e.g. a cylindrical or trapezoidal cavity. Such cavity may extend along an axis that is generally collinear with a direction of relative movement of the first and second parts. The extraction chamber is then delimited on one side by such cavity.

The other part of these first and second parts may be delimited by another cavity or include an extraction plate, such as a plate provided with piercing elements for opening a flow-through face of the capsule or a non-intrusive plate for cooperating with a pre-opened or a self-opening flow-through face of the capsule.

Examples of extraction chambers are disclosed in in WO 2008/037642 and WO 2013/026843.

At least one of these parts can have a capsule opener e.g. one or more capsule piercers.

The capsule can also include a self-opening mechanism. Self-opening capsules are for instance disclosed in CH 605 293 and WO 03/059778.

When closed capsules are used, the first and second parts may include a capsule opener such as blades and/or a tearing tool, e.g. a plate with a tearing profile, for instance as known from Nespresso™ machines or as disclosed in EP 0 512 470, EP 2 068 684 and WO 2014/076041 and the references cited therein.

At least one of the parts may have an opening for an inflow of liquid to be mixed with an ingredient contained in such capsule.

The machine includes a control unit for controlling the extracting unit to extract such capsule. The control unit can be powered by the mains e.g. via an electric cord.

The machine has an outlet for dispensing the beverage formed by extracting such capsule to a user-receptacle, such as a cup or a mug, located in a receptacle placing area.

A flavoured beverage may be prepared by circulating (by means of a liquid driver, e.g. a pump) a carrier liquid, such as water, into the capsule to flavour the liquid by exposure to a flavouring ingredient held in the capsule, e.g. along an extraction direction that may be generally parallel to the direction of relative movement of the first and second parts or to a longitudinal or central direction of the extraction.

For instance, the user receptacle can be placed on a receptacle support to collect the beverage.

The receptacle support can be formed by an external placement support on which such machine is located.

The receptacle support may be formed by a support comprised by the machine, e.g. a movable or removable machine support.

The receptacle placing area can be associated with a machine recipient support for supporting such user-recipient under the outlet. The support can be: associated with a drip tray e.g. a drip tray supporting the support; and/or movable relative to the housing vertically under the outlet and/or away from under the outlet for enabling a placement of user-recipients of different heights under the outlet.

Examples of suitable recipient supports are disclosed in EP 0 549 887, EP 1 440 639, EP 1 731 065, EP 1 867 260, U.S. Pat. Nos. 5,161,455, 5,353,692, WO 2009/074557, WO 2009/074559, WO 2009/135869, WO 2011/154492, WO 2012/007313, WO 2013/186339, WO 2016/096705, WO 2016/096706 and WO 2016/096707.

In embodiments, the outlet can be fixed to or formed by or mounted to or mounted in:

a machine head that has a deployed position in which the outlet is located above the receptacle placing area and a collapsed position in which the outlet is retracted within an external machine main housing, such as a machine head driven inwards into and outwards out of the main housing by at least one of the first and second parts or by an actuator controlled by the control unit; and/or a movable beverage guide that has a beverage dispensing configuration to dispense beverage to the receptacle placing area and a beverage stop configuration to prevent dispensing of beverage to the receptacle placing area, e.g. by draining residual beverage from the guide over a guide edge to a waste receptacle, such as a beverage guide driven between the dispensing configuration and the stop configuration by at least one of the first and second parts or by a (or the above) machine head or by an actuator controlled by the control unit.

For instance, the machine is provided with a machine head as disclosed in WO 2017/037212 and in WO 2017/037215.

Examples of suitable waste receptacles for carrying out the present invention are disclosed in EP 1867260, WO 2009/074559, WO 2009/135869, WO 2010/128109, WO 2011/086087, WO 2011/086088, PCT/EP2017/050237 and WO 2017/037212.

The directing fluid guide can be entirely confined in the main body and/or the machine head.

Details of directing fluid guides that are suitable or adaptable for carrying out the present invention are disclosed in WO 2006/050769, WO 2012/072758, WO 2013/127907, WO 2016/083488 and WO 2017/037212.

The extraction unit can include a capsule feeder for feeding a capsule to the extraction chamber, the feeder having a capsule dispenser with a release configuration for releasing such capsule from the feeder towards the extraction chamber and a retain configuration for retaining such capsule away from the extraction chamber.

The capsule dispenser can be formed by a mechanical and/or magnetic capsule gate such as a capsule holder e.g. having a shape complementary to and matching at least part of an outer shape of such capsule.

The capsule holder may have a capsule gate that is movable, such as pivotable and/or translatable, between a position obstructing a transfer towards the extraction chamber and a position clearing the transfer towards the extraction chamber.

The capsule holder may have an actuator for passing from the retain configuration to the release configuration and vice versa, such as an actuator controlled by the control unit.

Immediately after releasing a capsule towards the extraction, the capsule dispenser may be passed from the release configuration to the retain configuration so that access towards the extraction chamber is only provided when needed to release a capsule.

Details of suitable capsule dispensers are disclosed in WO 2012/126971, WO 2014/056641, WO 2014/056642 and WO 2015/086371.

The capsule feeder may include a passage for guiding such capsule to the extraction chamber into a predetermined capsule orientation for its entry into the extraction chamber such as a passage associated with capsule immobilizer for immobilizing such capsule between the first and second parts in their open position prior to relatively moving them into their closed position.

The interaction between the first and second parts (and optionally the capsule guiding passage) and an ingredient capsule may be of the type disclosed in WO 2005/004683, WO 2007/135135, WO 2007/135136, WO 2008/037642 and WO 2013/026856.

The control unit may control the capsule dispenser to release such capsule from the feeder when the first and second parts are in the open position or moving towards the open position, for an entry of such capsule into the extraction chamber when the first and second parts are brought back into their closed position.

The control unit may control the capsule dispenser to retain such capsule at the feeder and away from the extraction chamber when the first and second parts are:
in the closed position or relatively moving thereto; or
in the open position and about to relatively move to the closed position so as to leave insufficient time for such capsule, if it were released from the dispenser, to be received into the extraction chamber prior to the first and second parts reaching the closed position.

The capsule feeder may include or be associated with a capsule sensor connected to the control unit, the control unit being configured to bring or maintain the capsule dispenser in its retain configuration when the capsule sensor senses no such capsule on or at the capsule dispenser. Examples of capsule sensors are for example disclosed in WO 2012/123440, WO 2014/147128, WO 2015/173285, WO 2015/173289, WO 2015/173292, WO 2016/005352 and WO 2016/005417.

The control unit can be configured to control the actuator so that the first and second parts are moved by the actuator: from the closed position into the open position and from the open position into the closed position after a predetermined period of time starting for example from a beverage preparation triggering event such as for example capsule detection, capsule recognition, user actuation of the machine's user interface, etc., or a combination thereof, for instance a predetermined period of time in the range of 3 to 15 sec, such as 5 to 12 sec, e.g. 7 to 10 sec.

Examples of such parts that are relatively moved by an actuator (e.g. a motor) are disclosed in EP 1767129, WO 2012/025258, WO 2012/025259, WO 2013/127476 and WO 2014/056641.

For instance, the first part and the second part are relatively movable generally along a straight axis by the actuator from the closed to the open positions and/or vice versa.

The machine may include a liquid supplier for supplying liquid, e.g. water, into the extraction chamber, the liquid supplier being connected to and controlled by the control unit to supply such liquid into the extraction chamber and to interrupt such supply, automatically and/or manually via a user-interface connected to the control unit and/or when a removal of such receptacle is detected by the detecting arrangement. For instance, the liquid supplier includes one or more of: a source of said liquid, such as a liquid tank or a liquid connector for connection to an external liquid provider; one or more liquid tubes for guiding such liquid to the extraction chamber; a liquid driver, such as a pump e.g. a solenoid pump (reciprocating piston pump) or a peristaltic pump or a diaphragm pump, for driving such liquid into extraction chamber; and a thermal conditioner, e.g. a heater and/or a cooler, such as an inline thermal conditioner, e.g. an inline flow conditioner, for thermally conditioning such liquid.

Examples of suitable liquid sources, e.g. tanks or connectors, are disclosed in WO 2016/005349, EP2015194020.2, PCT/EP2017/050237 and the references cited therein.

The thermal conditioner may be a boiler or a thermoblock or an on demand heater (ODH), for instance an ODH of the type disclosed in EP 1 253 844, EP 1 380 243 and EP 1 809 151.

Examples of pumps and their incorporation into beverage machines are disclosed in WO 2009/150030, WO 2010/108700, WO 2011/107574 and WO 2013/098173.

The control unit may be configured to control the liquid supplier to supply automatically the liquid into the extraction chamber when:
the first and second parts have reached their closed position with the capsule housed in the extraction chamber upon moving the parts from the open to the closed positions so as to combine said liquid with an ingredient contained in the capsule and form the beverage for dispensing via the outlet, optionally after sensing with a (or the above) capsule sensor a supply of such capsule to the unit; and/or
the first and second parts have reached their closed position without any capsule housed in the extraction chamber so as to rinse or clean at least part of the unit and optionally the outlet, the liquid supplier being for instance configured to supply the liquid at a rinsing or cleaning temperature that is different to the temperature of such liquid for forming a beverage, e.g. by brewing.

In a particular embodiment, it is also contemplated to deliver cold or cooled beverages.

The control unit can be configured to control the liquid supplier not to supply automatically the liquid into the extraction chamber when the first and second parts have reached their closed position without any (for instance detected or recognised) capsule housed in the extraction chamber. For instance, the control unit is configured to control the liquid supplier to supply the liquid into the extraction chamber upon sensing a corresponding manual user-input on a user-interface connected to the control unit.

The control unit may have an end-of-extraction management program which is run automatically when the liquid supply is interrupted (e.g. when a predetermined extraction process is over or is detected as faulty) to:
immediately relatively move the first and second parts into their open position so as to remove any capsule from inbetween the first and second parts; or
to maintain the first and second parts in the closed position during a predetermined period of time, e.g. in the range of 1 to 5 sec such as 2 to 3 sec, for allowing a manual request, e.g. via a user-interface connected to the control unit, to supply via the liquid supplier an additional amount of liquid into the extraction chamber and, in the absence of such manual request during the predetermined period of time, to relatively move the first and second parts into their open position so as to remove any capsule from inbetween the first and second parts, for instance to remove such capsule into a used-capsule collector formed by a (or the above) waste receptacle.

For instance, prior to moving the first and second parts into their closed position, the parts may remain into their open position for a predetermined period of time, such as a period of time in the range of 1 to 6 sec. e.g. 2 to 4 sec, for allowing an insertion of a new capsule inbetween the first and second parts prior to relatively moving them into their closed position with the new capsule housed in the extraction chamber for an extraction of the new capsule.

Hence, a user can request the dispensing of two (or more) portions of beverages (e.g. a double expresso) into the same user-recipient.

According to the invention, the machine comprises:
an extraction unit for extracting a beverage ingredient capsule to form a beverage, e.g. a unit having a first part and a second part that are relatively movable between an open position for inserting and/or removing a capsule and a closed position, such as a closed position in which the first and second parts delimit an extraction chamber, for securing and extracting such capsule, optionally at least one of said parts has a capsule opener e.g. one or more capsule piercers and/or at least one of said parts has an opening for an inflow of liquid to be mixed with an ingredient contained in such capsule;
a control unit for controlling the extraction unit to extract the capsule, such as a control unit powered by the mains e.g. via an electric cord;
an outlet for dispensing the beverage formed by extracting the capsule to a user-receptacle, such as a cup or a mug, located in a receptacle placing area, such as on a receptacle support e.g. an external placement support on which such machine is located or a machine support e.g. a movable or removable machine support, to collect said beverage,
a capsule recognition module for recognizing a type of a capsule inserted in said machine, the capsule recognition module comprising:
a light source for lighting at least part of the surface of the capsule;
an optical sensor for sensing an optical property of the at least part of the surface of the capsule;
wherein the capsule recognition module is configured to:
determine a correction value of the optical property by sensing the optical property of the at least part of the surface of the capsule while the light source is switched off;
determine at least one sample value of the optical property by sensing the optical property of the at least part of the surface of the capsule (3) while the light source is switched on;
calculate a corrected sample value with the correction value and the at least one sample value;
determine a type of the capsule by comparing the corrected sample value with at least one reference value, the at least one reference value being representative of a type of capsule.

Preferably, the capsule recognition module is configured to calculate the corrected sample value by subtracting the correction value from the at least one sample value.

In embodiments, the capsule recognition module is configured to successively determine more than one, for example three, sample values of the at least part of the surface of the capsule while the light source is switched on. The thus determined sample values are then for example compared to each other in order to detect a possible variation in the sensing conditions during the sample value measurement, which may be indicative of an unstable capsule and/or of rapidly changing ambient conditions, in particular ambient lighting conditions. If the variation within the sample values is higher than a predetermined threshold, then the sample values are for example disregarded and the capsule recognition process is interrupted and possibly repeated from the start. If the variation is lower than or equal to the predetermined threshold, then one of the sample values is used as sample value resulting from the sensing step, or the sample values are averaged and the average is used as the sample value resulting from the sensing step. The corrected sample value is then calculated for example by subtracting the correction value from the resulting sample value.

The capsule recognition module is preferably configured to determine the correction value in a first step and to determine the at least one sample value in a second step, the capsule recognition module being further configured to:
in a step subsequent to the second step, determine a control value of the optical property by sensing the optical property of the at least part of the surface of the capsule while the light source is switched off;
calculate a difference between the control value and the correction value;
if the difference is equal or above a predefined threshold, discard the previously determined at least one sample value and start the capsule recognition process again at the first step;
if the difference is below the predefined threshold, transmit the determined type of the capsule to the machine's control unit.

The sensed optical property is for example a colour of the capsule and the values are vectors characterizing such colour, for example three dimensional colour vectors. The capsule recognition module may then be configured to determine a type of the capsule by computing an Euclidian distance between the corrected sample value and at least one reference value, the at least one reference value being representative of a type of capsule.

Preferably, the machine comprises a capsule recognition position.

The machine may also further comprise a capsule detector for detecting the presence of a capsule located on or approaching a capsule feeder of the machine and triggering capsule recognition by the capsule recognition module.

The machine may further comprise a material detector for recognising a material of a capsule located on or approaching a capsule feeder of the machine.

In another aspect, the invention relates to a combination of such a machine and a capsule, e.g. such capsule being in the machine's extraction chamber or such capsule being handled by a capsule feeder of the machine.

In yet a further aspect, the invention relates to a method of preparing and dispensing a beverage from a capsule in such a machine, the method comprising:
inserting a capsule in the machine;
determining a correction value of an optical property of at least part of the surface of the capsule by sensing with the optical sensor the optical property while the light source is switched off;
determining at least one sample value of the optical property by sensing the optical property of the at least part of the surface of the capsule while the light source is switched on;
calculating a corrected sample value with the correction value and the at least one sample value;
determining a type of the capsule by comparing the corrected sample value with at least one reference value, the at least one reference value being representative of a type of capsule.

The corrected sample value may be calculated by subtracting the correction value from the at least one sample value.

Preferably, the step of determining at least one sample value comprises successively determining three sample values of the at least part of the surface of the capsule while the light source is switched on and to calculate the corrected sample value by calculating an average of the three sample values and subtracting the correction value from the average.

In preferred embodiments, the step of determining the correction value is performed in a first step and the step of determining the at least one sample value is performed in a second step, wherein the method further comprises:

- in a step subsequent to the second step, determining a control value of the optical property by sensing the optical property of the at least part of the surface of the capsule while the light source is switched off;
- calculating a difference between the control value and the correction value;
- if the difference is equal or above a predefined threshold, discarding the previously determined at least one sample value and starting the capsule recognition process again at the first step;
- if the difference is below the predefined threshold, transmitting the determined type of the capsule to the control unit.

BRIEF DESCRIPTION OF THE DRAWINGS

The invention will now be described with reference to the schematic drawings, wherein.

DETAILED DESCRIPTION

Figure 1:
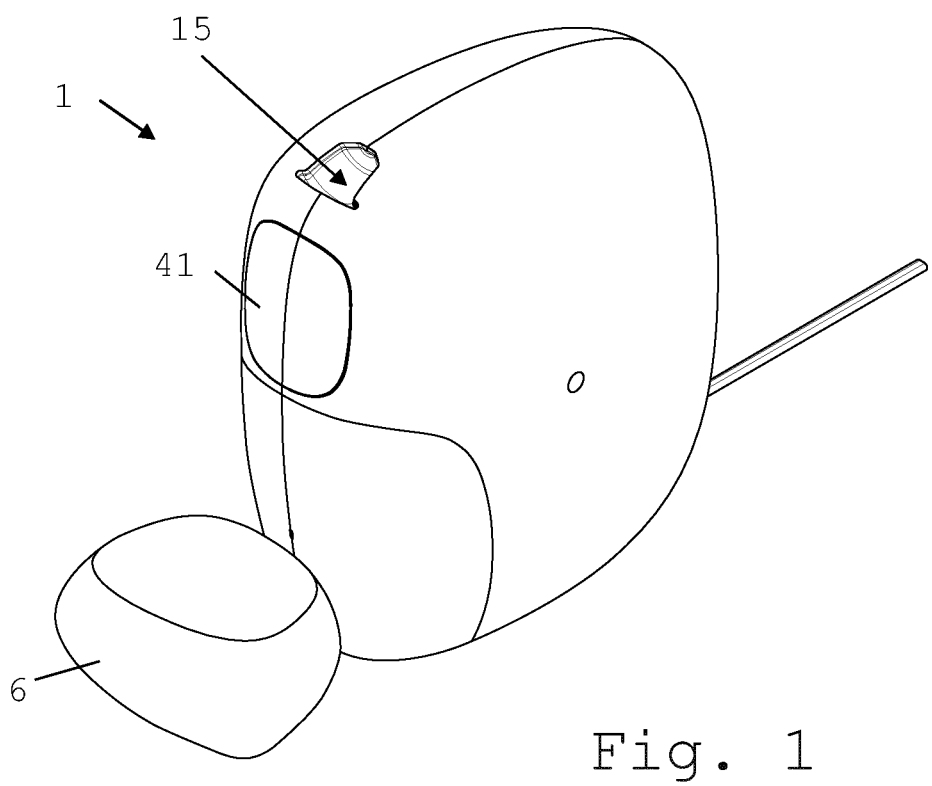
FIG. 1 is a perspective view of a machine according to the invention.

FIGS. 1 to 8 illustrate an exemplary embodiment of a beverage machine 1 according to the invention for preparing and dispensing a beverage 2, such as tea, coffee, hot chocolate, cold chocolate, milk, soup or baby food. The ingredient may be supplied in the form of an ingredient capsule 3, e.g. of the type described above under the header "Field of the Invention".

The sequence from FIGS. 1 to 8 illustrates a beverage preparation sequence in machine 1 from the supply of an ingredient capsule 3 to the removal of capsule 3 upon beverage preparation.

Machine 1 includes an extraction unit 10 for extracting beverage ingredient capsule 3 to form beverage 2. Extraction unit 10 for example has a first part 11 and a second part 12 that are relatively movable between an open position for inserting and/or removing capsule 3 and a closed position, such as a closed position in which first and second parts 11, 12 delimit an extraction chamber 100, for securing and extracting such capsule 3. For instance, at least one of parts 11, 12 has a capsule opener, e.g. one or more capsule piercers, and/or at least one of said parts 11, 12 has an opening for an inflow of liquid to be mixed with an ingredient contained in such capsule 3.

Machine 1 includes a control unit 40, schematically illustrated in FIGS. 2-8, for controlling extraction unit 10 to extract capsule 3. Control unit 40 may be powered by the mains, e.g. via an electric cord 45, or by a DC source, e.g. one or more batteries such as a car battery or portable battery or machine battery.

Machine 1 has an outlet 20 for dispensing beverage 2 formed by extracting such capsule 3 to a user-receptacle 4, such as a cup or a mug, located in a receptacle placing area to collect beverage 2. Such a receptacle placing area may be on a receptacle support 5, 6, e.g. an external placement support 5 on which such machine 1 is located or a machine support 6, e.g. a movable or removable machine support 6, e.g. a machine support 6 that is located on or above an external placement support 5.

In embodiments, outlet 20 is for example fixed to or formed by or mounted to or mounted in a machine head 21. The machine head 21 for example has a deployed position in which outlet 20 is located above the receptacle placing area and a collapsed position in which outlet 20 is retracted within an external main housing 14 of the machine 1. Machine head 21 may be driven inwards into and outwards out of the housing 14 by at least one of the first and second parts 11, 12 or by an actuator controlled by the control unit.

Figure 2:
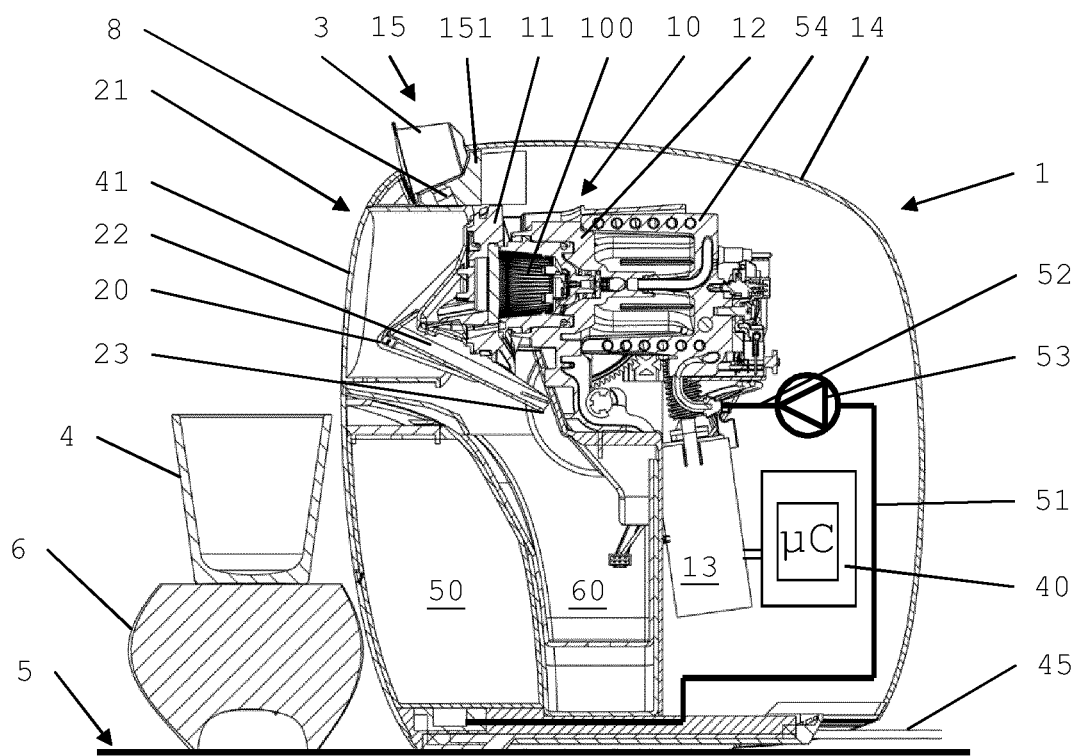
FIG. 2 is a cross-sectional view of the machine shown in FIG. 1 with a capsule to be recognized and fed towards the machine's extraction chamber, and with a user-receptacle.
Figure 3:
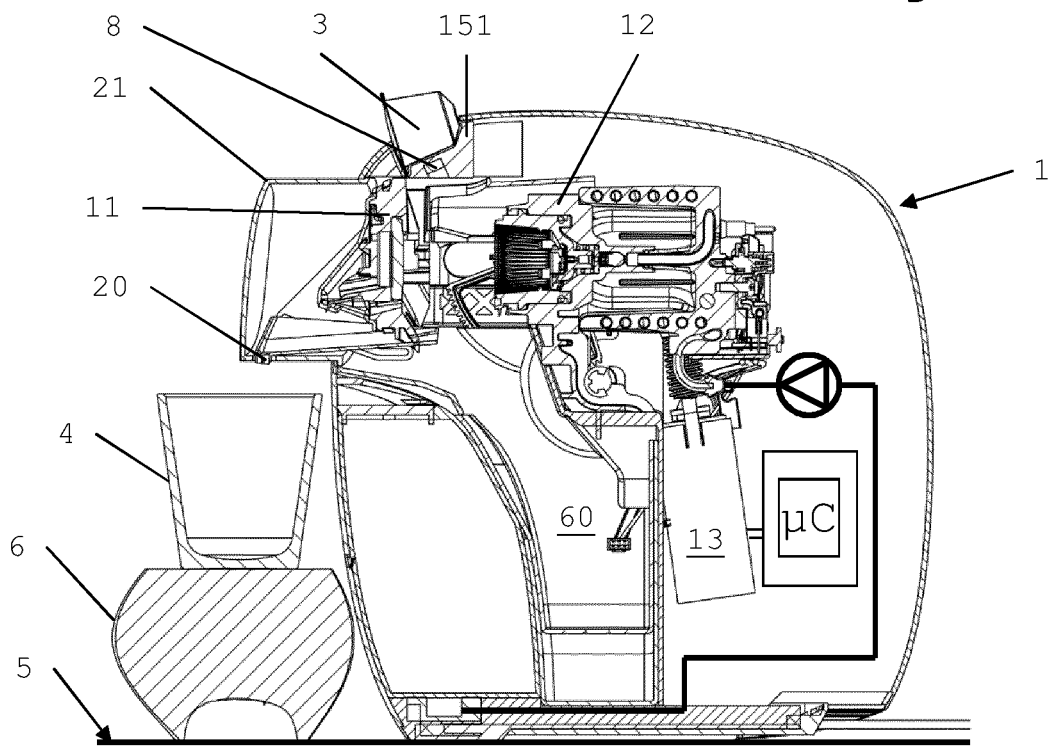
FIG. 3 illustrates the machine and capsule shown in FIG. 2 with the first and second parts that have been brought from their closed position into their open position.
Figure 4:
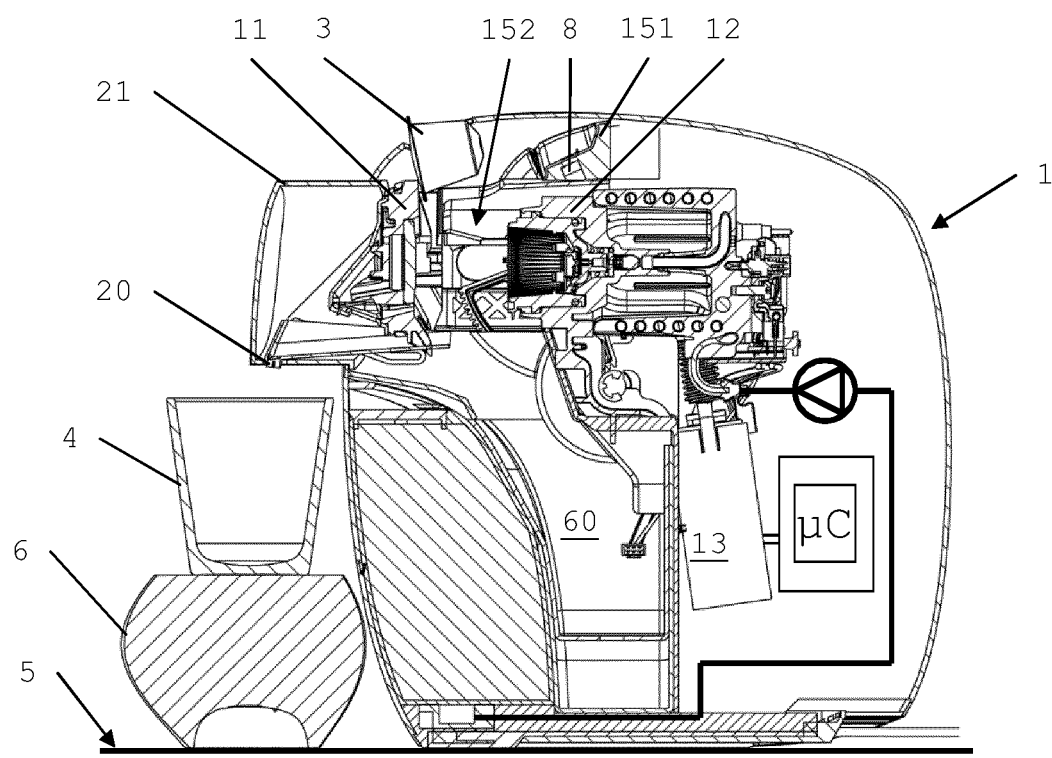
FIG. 4 is a cross-sectional view of the machine and capsule of FIG. 3, the capsule having been released towards the extraction chamber.
Figure 5:
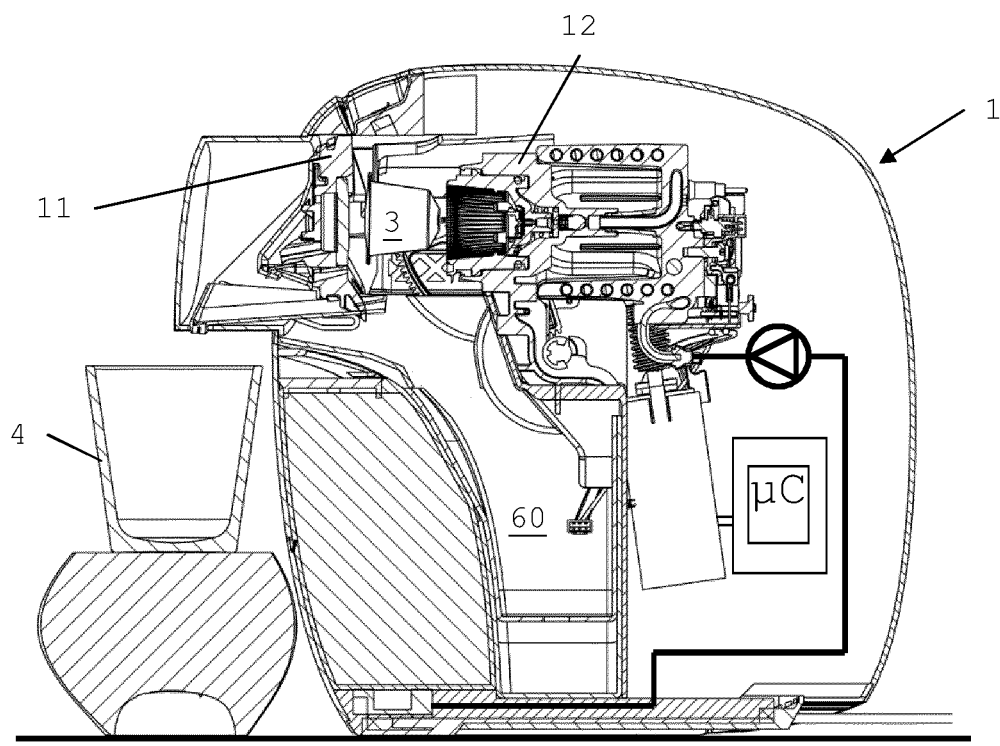
FIG. 5 illustrates the machine and capsule of FIG. 4, the released capsule having been immobilized between the first and second parts in their open position.
Figure 6:
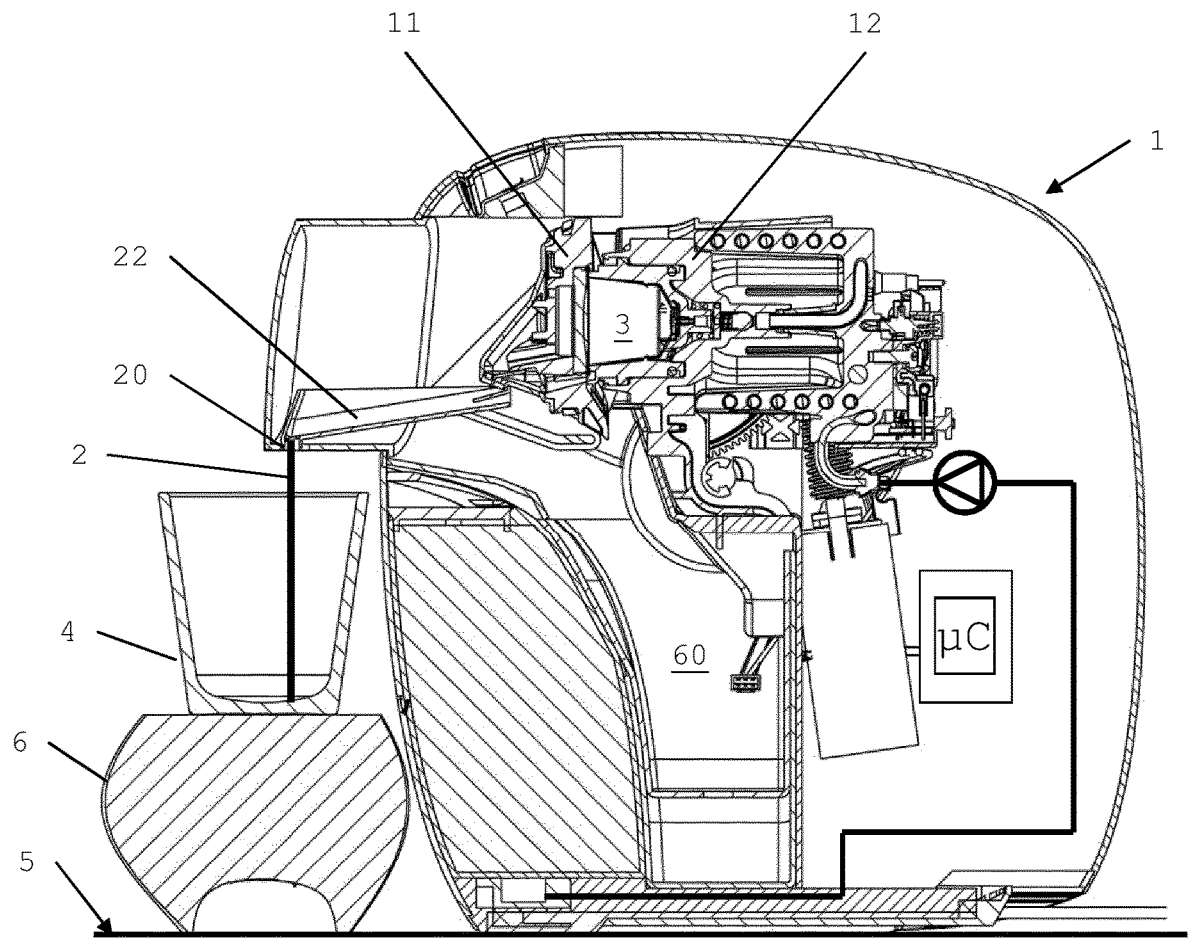
FIG. 6 illustrates the machine and capsule of FIG. 5, the first and second parts having being moved relative to each other into their closed position to form the extraction chamber in which the capsule is housed, the liquid supplier supplying liquid into the extraction chamber to mix with a flavouring ingredient in the capsule and dispense it to the user-receptacle via the outlet.

Outlet 20 can be fixed to or formed by or mounted to or mounted in a movable beverage guide 22 that has a beverage dispensing configuration illustrated for example on FIG. 6 to dispense beverage 2 to the receptacle placing area and a beverage stop configuration visible for example in FIG. 2 to prevent dispensing of beverage to the receptacle placing area, e.g. by draining residual beverage from guide 22 over a guide edge 23 to a waste receptacle 60. Guide 22 can be driven between the dispensing configuration and the stop configuration by at least one of first and second parts 11, 12 or by a (or the above) machine head 21 or by an actuator controlled by the control unit.

Extraction unit 10 includes an actuator 13 configured to relatively move first and second parts 11, 12 relative to each other between their open and closed positions. Actuator 13 is connected to control unit 40 and controlled thereby to move first and second parts 11, 12 relative to each other.

Control unit 40 is connected to an input device for initiating and/or controlling the extraction unit 10. According to the invention, the input device comprises for example a user interface 41 and a capsule recognition module 8 to recognise a type of a capsule 3 ready to be inserted into the extraction unit 10. The input device optionally further comprises a capsule sensor for sensing the presence of a capsule 3 located in and/or approaching the extraction unit 10, for example for sensing the presence of a capsule 3 located in and/or approaching a capsule recognition position.

Extraction unit 10 may include a capsule feeder 15 for feeding a capsule 3 to extraction chamber 100. The capsule feeder 15 can have a capsule dispenser 151 with a release configuration for releasing the capsule 3 from the capsule feeder 15 towards the extraction chamber 100 and a retain configuration for retaining the capsule 3 away from the extraction chamber 100. The capsule feeder 15 can include a mechanical and/or magnetic capsule gate such as a capsule holder 151 e.g. matching at least part of an outer shape of the capsule 3.

The capsule feeder 15 can have a passage 152 (FIG. 4) for guiding the capsule 3 to the extraction chamber 100 into a predetermined capsule orientation for its entry into the extraction chamber 100, such as a passage 152 being preferably associated with a capsule immobilizer for immobilizing the capsule 3 between the first and second parts 11, 12 in their open position (FIG. 5) prior to moving the first and second parts 11, 12 relative to each other into their closed position (FIG. 6).

The control unit 40 may control the capsule dispenser 151 to release the capsule 3 from the feeder 15 when the first and second parts 11, 12 are in the open position (FIG. 4) or when they are moving towards the open position, for an entry of the capsule 3 into the extraction chamber 100 when the first and second parts 11, 12 are brought back into their closed position (FIG. 6).

Control unit 40 may control capsule dispenser 151 to retain the capsule 3 at the feeder 15 and away from the extraction chamber 100 when the first and second parts 11, 12 are: in the closed position or moving thereto (FIG. 2); or in the open position and about to move to the closed position so as to leave insufficient time for the capsule 3, if it were released from the dispenser 151, to be received into the extraction chamber 100 prior to the first and second parts 11, 12 reaching the closed position.

Figure 7:
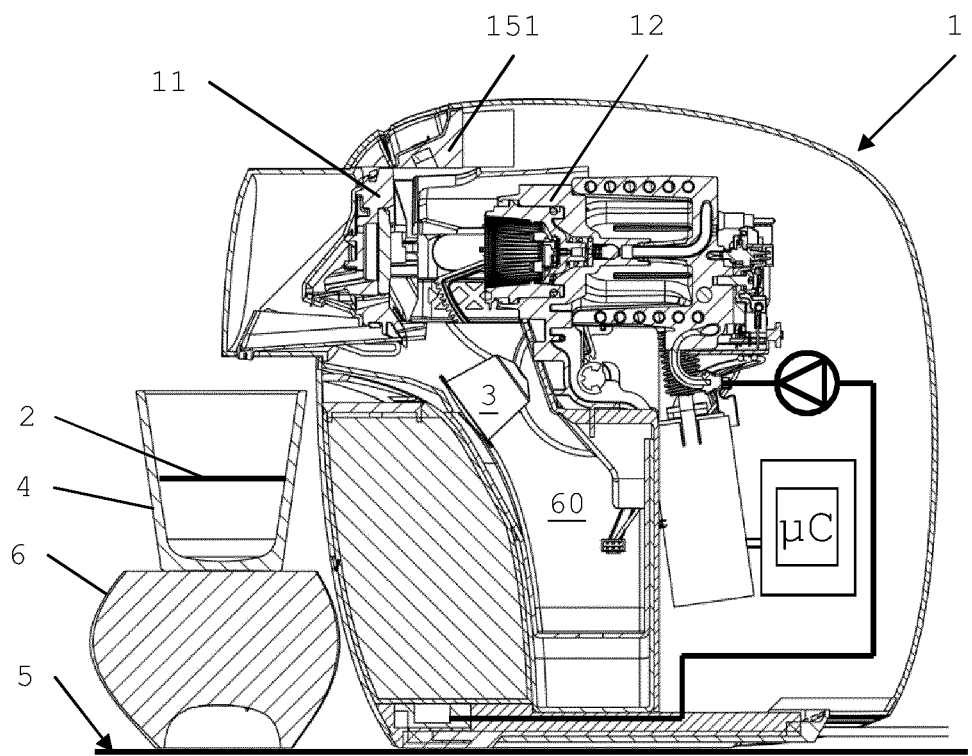
FIG. 7 shows the machine and capsule of FIG. 6 after extraction of the capsule and after moving the first and second parts relative to each other into their open position, the capsule being ejected into a waste collector and no new capsule being fed towards the machine's extraction chamber.
Figure 8:
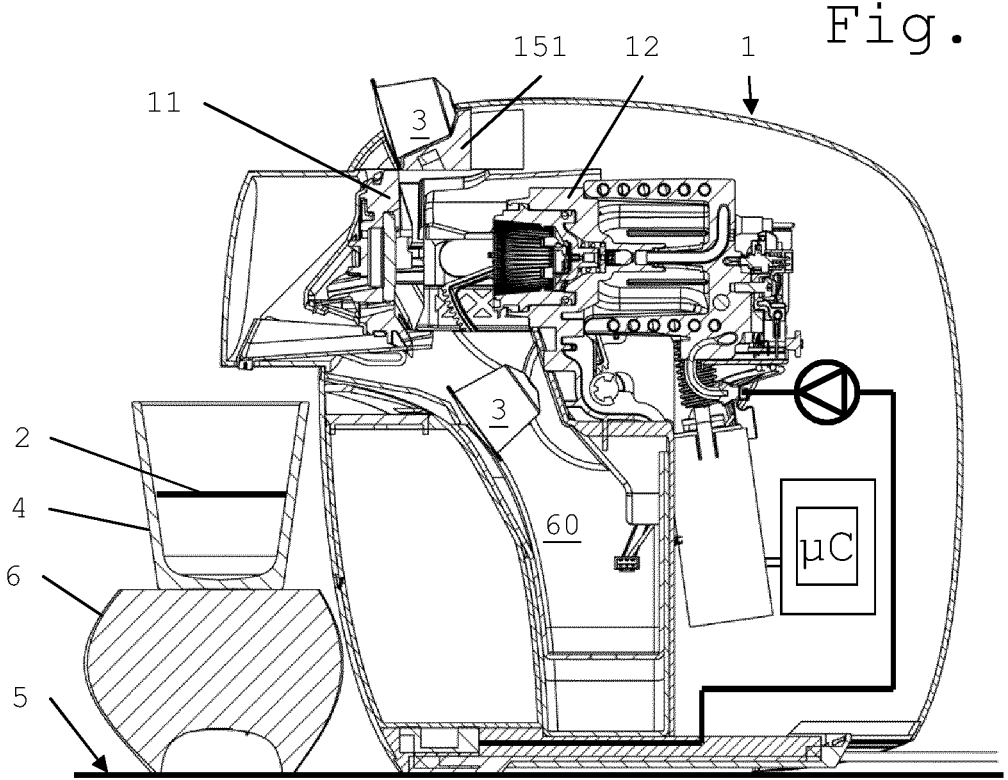
FIG. 8 illustrates a variation of the machine and capsule of FIG. 7 in which a new capsule is fed towards the machine's extraction chamber at the ejection of an extracted capsule.

Optionally, the capsule feeder 15 may include or be associated with a capsule sensor connected to the control unit 40, which is for example configured to bring or maintain the capsule dispenser 151 in its retain configuration when the capsule sensor senses no capsule 3 on or at the capsule dispenser 151 (FIG. 7).

The control unit 40 may be configured to control the actuator 13 so that the first and second parts 11, 12 are moved by the actuator 13 from the open position into the closed position after a predetermined period of time has lapsed starting from a beverage preparation triggering event such as for example capsule detection, capsule recognition, user actuation of the machine's user interface, or reaching the open position, or a combination thereof (FIGS. 2 to 6). For instance, the predetermined period of time is in the range of 3 to 15 sec, such as 5 to 12 sec, e.g. 7 to 10 sec.

The extraction unit 10 may include a liquid supplier 50, 51, 52, 53, 54 for supplying liquid, e.g. water, into the extraction chamber 100 (FIG. 2). The liquid supplier 50, 51, 52, 53, 54 can be connected to and controlled by the control unit 40 to supply liquid into the extraction chamber 100 and to interrupt such supply, for example automatically and/or manually via a user-interface 41 connected to the control unit 40.

For instance, the liquid supplier 50, 51, 52, 53, 54 includes one or more of: a source of liquid 50, such as a liquid tank or a liquid connector for connection to an external liquid provider; one or more liquid tubes 51, 52 for guiding the liquid to the extraction chamber 100; a liquid driver 53, such as a pump, for driving the liquid into the extraction chamber 100; and a thermal conditioner 54, e.g. a heater and/or a cooler, such as an inline thermal conditioner, e.g. an inline flow conditioner, for thermally conditioning the liquid.

The control unit 40 can be configured to control the liquid supplier 50, 51, 52, 53, 54 to supply automatically the liquid into the extraction chamber 100 when the first and second parts 11, 12 have reached their closed position with the capsule 3 housed in the extraction chamber 100 upon moving the first and second parts 11, 12 from the open to the closed positions so as to combine the liquid with an ingredient contained in the capsule 3 and form the beverage 2 for dispensing via the outlet 20. See FIG. 6.

The control unit 40 may be configured to control the liquid supplier 50, 51, 52, 53, 54 to supply automatically the liquid into the extraction chamber 100 when the first and second parts 11, 12 have reached their closed position without any capsule housed in the extraction chamber 100 so as to rinse or clean at least part of the extraction unit 10 and optionally the outlet 20. For instance, the liquid supplier 50, 51, 52, 53, 54 is configured to supply liquid at a rinsing or cleaning temperature that is different to the temperature of such liquid for forming a beverage, e.g. by brewing.

In embodiments, it is also contemplated to deliver cold or cooled beverages.

The control unit 40 can be configured to control the liquid supplier 50, 51, 52, 53, 54 not to supply automatically liquid into the extraction chamber 100 when the first and second parts 11, 12 have reached their closed position without any capsule housed in the extraction chamber 100. For instance, the control unit 40 is configured to control the liquid supplier 50, 51, 52, 53, 54 to supply the liquid into the extraction chamber 100 upon sensing a corresponding manual user-input on a user-interface 41 connected to control unit 40.

According to the invention, the machine 1 includes a capsule recognition module 8 connected to the control unit 40 and configured to recognize a type of a capsule 3 fed or ready to be fed to the extraction chamber 100, preferably of a capsule 3 located in a defined capsule recognition position. According to the invention, the capsule recognition module 8 recognizes a type of a capsule 3 by recognizing at least one optical property of at least part of the surface of the capsule 3, for example a colour, a luminance, or any other optical property.

The control unit 40 is preferably configured to control the liquid supplier 50, 51, 52, 53, 54 according to a liquid supply program associated with the type, such as a liquid supply program with one or more adjusted supplied liquid parameters selected from a liquid temperature, flow, pressure and volume that is/are constant or variable during an extraction of the recognised capsule 3. For instance, the type can be selected from a plurality of capsule types extractible in extraction chamber 100 and each associated with at least one reference optical property stored in an internal or external data storage means connected or connectable with the control unit 40.

The capsule recognition module 8 is for example positioned in the vicinity of the capsule feeder 15, and more particularly, near, around and/or in the capsule dispenser 151. The capsule recognition position is for example defined in the capsule feeder 15, for example on the capsule dispenser 151.

The control unit 40 may have an end-of-extraction management program which is run automatically when the liquid supply is interrupted (e.g. when a predetermined extraction process is over or is detected as faulty) to:
- immediately move first and second parts 11, 12 relative to each other into their open position so as to remove any capsule 3 from inbetween the first and second parts 11, 12; or
- to maintain the first and second parts 11, 12 in the closed position during a predetermined period of time, e.g. in the range of 1 to 5 sec such as 2 to 3 sec, for allowing a manual request, e.g. via a user-interface 41 connected to control unit 40, to supply via the liquid supplier 50, 51, 52, 53, 54 an additional amount of liquid into extraction chamber 100 and, in the absence of such manual request during said predetermined period of time, to move the first and second parts 11, 12 relative to each other into their open position so as to remove any capsule 3 from inbetween the first and second parts 11, 12, for instance to remove such capsule 3 into a used-capsule collector 60 formed by a (or the above) waste receptacle 60.

Optionally, prior to moving the first and second parts 11, 12 into their closed position, the first and second parts 11, 12 may remain into their open position for a predetermined period of time, such as a period of time in the range of 1 to 6 sec. e.g. 2 to 4 sec, for allowing an insertion of a new capsule 3 inbetween the first and second parts 11, 12 prior to relatively moving them into their closed position with new capsule 3 housed in the extraction chamber 100 for an extraction of the new capsule 3.

During use, the following steps can be carried out (FIGS. 1 to 6):
- placing a receptacle 4 in the receptacle placing area;
- placing a capsule 3 on the capsule feeder 15;
- recognizing a type of the capsule 3 by the capsule recognition module 8;
- relatively moving the first and second parts 11, 12 into their open position automatically, semi-automatically or manually;
- supplying the capsule 3 to the extraction unit 10;
- relatively moving the first and second parts 11, 12 into their closed position to position the capsule 3 in the extraction chamber 100;
- extracting the capsule 3 in the extraction chamber 100 applying extraction parameters determined on the basis of the recognised type of the capsule 3 to prepare a beverage 2; and
- dispensing the prepared beverage 2 via the outlet 20 to the receptacle 4.

According to the invention, the recognition module 8 is configured to determine a type of a capsule 3 inserted in or placed on the machine 1, preferably in a capsule recognition position, for example on the capsule feeder 15, by recognising at least one optical property of at least part of the surface of the capsule 3.

Machine 1 typically allows extracting capsules of different types in order to prepare different beverages and/or different beverage styles. The different types of capsules extractible in the extraction chamber 100 for example correspond to different ingredients contained therein and/or different ingredient conditioning. In embodiments, each type of capsule corresponds to a particular type of coffee, which differs from the coffee contained in capsules of other types for example, but not exclusively, in one or more of its origin, its roasting degree, its grounding level, its quantity contained in the capsule and/or its caffeine content. Alternatively or in combination thereof, different types of capsules extractible in the machine 1 correspond to ingredients for the preparation of different beverages, such as for example coffee, milk, soup, baby milk, tea, cold beverages, etc.

Preferably, each type of capsule is associated to at least one specific optical property, for example a reference colour, a reference luminance, or another reference optical property, of at least part of the surface of the capsule 3, thereby for example allowing a user visually differentiating capsules of different types. Data representative of such reference optical properties, for example reference colour vectors and/or luminance values, is preferably stored in an internal or external data storage means connected or connectable with control unit 40 and/or with capsule recognition module 8.

The machine 1 may be configured to extract each capsule 3 using preparation parameters specific to the particular type of the capsule 3. The preparation parameters for example include one or more of: a carrier liquid temperature, a carrier liquid volume, an extraction time, a carrier liquid pressure, a carrier liquid type, a number of successive preparation phases, etc. The preparation parameters for use with each type of capsule extractible in the machine 1 are preferably stored in an internal or external data storage means connected or connectable with the control unit 40 and/or with the capsule recognition module 8. The appropriate preparation parameters are selected on the basis of the type of the capsule 3 determined by the capsule recognition module 8 and used by the control unit 40 for controlling the extraction of the recognised capsule 3.

The machine 1 may also be configured to store and/or to transmit to an external server information about the type of each capsule extracted in the machine, in order for example to monitor the capsule consumption at the machine 1.

Figure 9:
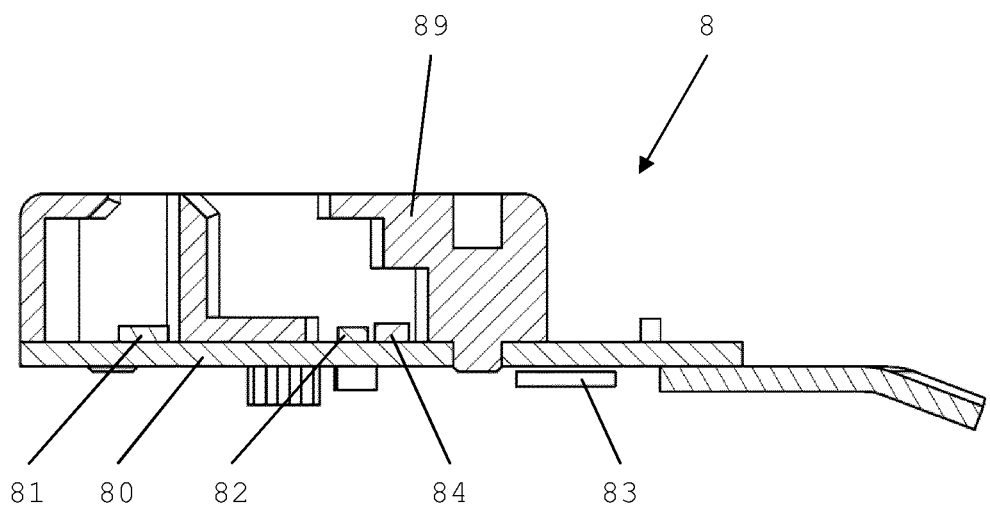
FIG. 9 is a cross-sectional view of a capsule recognition module according to an embodiment of the invention and a capsule being recognised.

With reference to FIG. 9, the capsule recognition module 8 comprises a source of light 82, for example a white LED or any other appropriate source of light, preferably with known and definite spectrum, and an optical sensor 81, for example a camera, a colour sensor, a photosensor or any other optical sensor appropriate to capture the optical property to be measured. The capsule recognition module 8 further preferably comprises a controller 83, for example but not exclusively an ASIC or a programmable microcontroller, for controlling the source of light 82 and the optical sensor 81, for example for switching the source of light 82 on and off and/or for receiving and handling the signals from the optical sensor 81. The source of light 82, the optical sensor 81 and the controller 83 are preferably attached, for example soldered, to an electronic board 80, typically a PCB, providing them in a known manner with the necessary power and data connections and/or interconnections. The controller 83 is preferably connected to and controlled by the control unit 40 of the machine 1.

In embodiments, the capsule recognition module 8 for example comprises a light guide 89 for guiding light emitted by the source of light 82 towards the capsule recognition position, or at least a part thereof, and for limiting the light received by the optical sensor 81 preferably to the light reflected by an object located at the capsule recognition position in order to avoid as much as possible sensing parasitic light, for example ambient light. The light guide 89 is for example in the form of a cover associated with, for example attached to, the electronic board 80 and at least partly covering the source of light 82 and/or the optical sensor 81. The cover comprises for example openings or other guiding means for guiding the light to and from the capsule recognition position. In the illustrated example, cavities are formed in the cover above each of the optical sensor 81 and the source of light 82, which are open on their upper side. The inner walls of the cavities are preferably shaped in order to avoid reflections within the cavities that may lead to faulty lightning of the object located at the capsule recognition position and/or faulty sensing of the light reflected by said object.

Optionally, the machine 1 comprises a capsule detector 84 for detecting a capsule located on or approaching the capsule feeder. The capsule detector 84 is for example comprised in the capsule recognition module 8, preferably attached to, for example soldered on, the electronic board 80. Other dispositions of the capsule detector are however possible within the frame of the invention. The capsule detector 84 may be of any appropriate type, for example a presence and/or movement detector, such as an infrared (IR) detector, an inductive and/or resistive detector, a mechanical switching element, etc. The capsule detector 84 is for example controlled by the controller 83 of the capsule recognition module 8 or directly controlled by the control unit of the machine. The capsule detector 84 for example detects the presence of a capsule located at or approaching the capsule recognition position.

In embodiments, the machine 1 further comprises a material detector, which is not represented on the figures, for detecting a material of a capsule located on or approaching the capsule feeder. The material detector is for example an inductor or a resistive element recognizing a metallic body of a capsule. The output of the material detector is for example sent to the controller 83 and used in conjunction with the output of the capsule recognition module 8 as an additional criterion for determining a type of the capsule located on or approaching the capsule feeder. The material detector may be an additional detector in addition to the optional capsule detector 84. Alternatively, a single detector, for example an inductive, capacitive or resistive detector, may be used as capsule detector and material detector.

Figure 10:
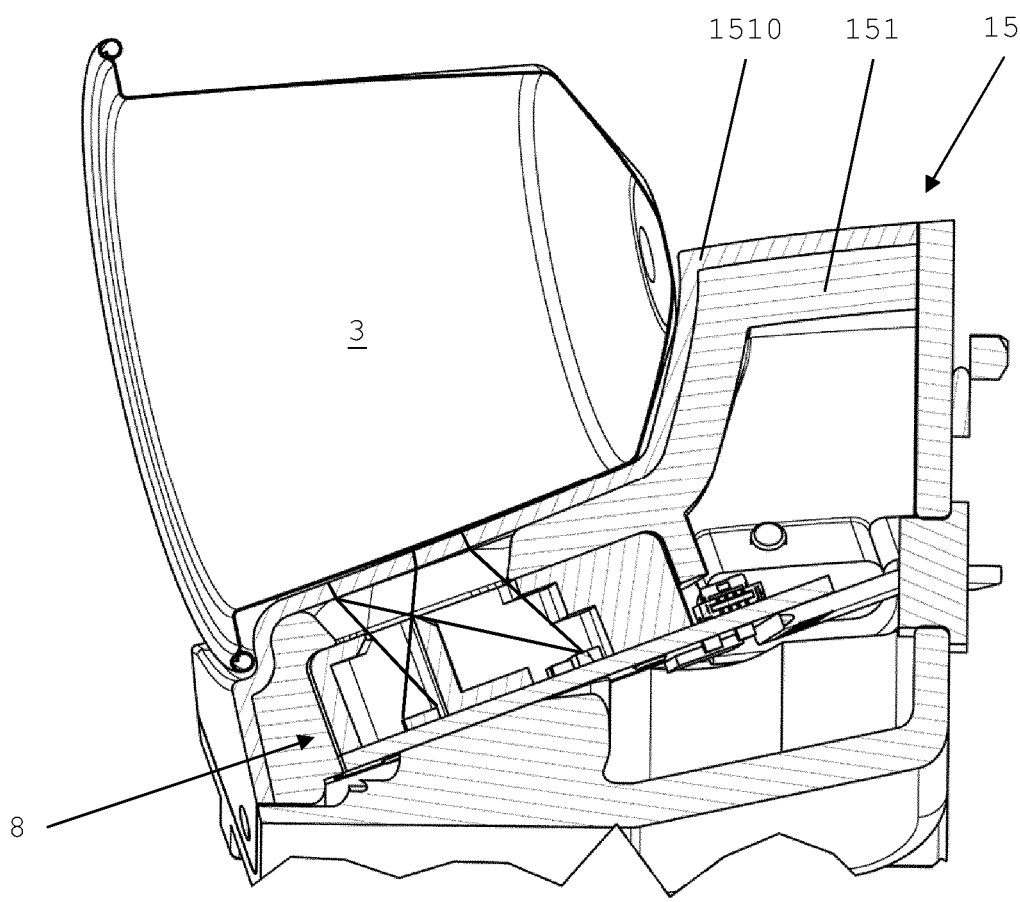
FIG. 10 is a cross-sectional view of the capsule recognition module of FIG. 9.

FIG. 10 shows a capsule 3 placed at a capsule recognition position in the capsule feeder 15 of the machine before its introduction into the machine's extraction chamber. The capsule recognition module 8 is preferably associated with or part of the capsule feeder 15. The capsule recognition module 8 is for example attached to the capsule holder 151 and positioned such that the light emitted by the source of light 82 is directed towards the surface of a capsule 3 placed at the capsule recognition in the capsule feeder 15, and such that at least part of the light of the source of light 82 that is reflected by the surface of the capsule 3 is directed towards the optical sensor 81.

In the illustrated example, the capsule recognition module 8 is attached under the capsule receiving surface of the capsule holder 151. A window is formed in the preferably opaque material of the capsule holder 151, which cooperates with the openings of the light guide 89 of the capsule recognition module 8 for allowing light emitted by the source of light 82 to reach at least a part of the surface of a capsule 3 placed at the capsule recognition position on the capsule holder 151, and for allowing light reflected by said surface to be received by the optical sensor 81.

The window formed in the preferably opaque material of the capsule holder 151 is preferably covered by a translucent material in order to protect the elements of the capsule recognition module 8, in particular the optical sensor 81, the source of light 82 and the optional capsule detector 84, from external mechanical aggressions such as, but not exclusively, dirt, objects inserted in the window of the capsule holder 151, etc. In embodiments, the capsule receiving surface of the capsule holder 151 is covered with a semi-transparent skin 153 made for example of a rigid semi-transparent plastic material and shaped, for example moulded, to match the shape of the surface of the capsule 3 in order to provide a stable position to the capsule 3 when correctly placed at the capsule recognition position on the capsule holder 151. In embodiments, the cover 153 is furthermore lightly tinted in order to at least partly hide the capsule recognition module 8 and its elements to the view of a user of the machine while not significantly impairing optical sensing of the capsule 3 by the capsule recognition module 8.

In embodiments, when a capsule 3 is approached to and/or placed at the capsule recognition position in the capsule feeder 15, the optional capsule detector 84 detects the presence of the capsule 3 and sends a corresponding signal to the controller 83 and/or to the machine's control unit, which activates the capsule recognition module 8 to start a capsule recognition process.

The capsule recognition process comprises activating the source of light 82 to illuminate at least part of the surface of a capsule 3 located at the capsule recognition position, activating the optical sensor 81 to sense at least one optical property, for example a colour, a luminance or another optical property, of the capsule 3 from the light reflected by said surface and received by the optical sensor 81, and determine a sample value characterizing such optical property of the capsule 3, or of the sensed surface of the capsule 3. The sample value is for example a numerical value characterizing an optical property such as a luminance, a reflectivity in a predetermined frequency range, etc., or a vector of numerical values, for example a three dimensional vector characterizing a colour, as described for example in published PCT application WO 2018/229102 A1. At least one sample value of the capsule 3 or an average of several sample values is then compared with one or more known reference values of the optical property, each reference value being typically representative of a different type of capsule. Preferably, the type of the capsule 3 to be recognized will be determined as being the type whose representative reference value is closest to the sample value or average sample value determined for the capsule 3.

Alternatively, in particular if the machine does not comprise any capsule detector, the capsule recognition module 8 is activated by a user actuation for example of the machine's user interface, for example by the activation of a beverage preparation command.

In embodiments, the capsule recognition module 8 is a colour recognition module and the capsule recognition is performed for example as described in PCT application WO 2018/229102 A1, which is incorporated herewith by reference. Alternatively or in combination thereof, the capsule recognition module may determine an overall reflectivity of the surface of the capsule 3, a reflection level in one or more frequency spectra, a luminance or any other appropriate optical property.

For the sake of conciseness, the term value as used throughout this application may designate a single numerical value, such as for example a luminance value or an overall reflectivity level preferably within a limited frequency range; or a vector of numerical values, for example an RGB colour vector or a colour vector as described in WO 2018/229102 A1.

In order to eliminate or to at least mitigate the effects of the ambient light on the determination of a sample value representative of the sensed optical property of a capsule located in the capsule recognition position and thereby reduce the probability of errors in the capsule recognition process, the capsule recognition module 8 of the invention is configured to perform a correction step.

According to the invention, the correction step comprises sensing the optical property of a capsule 3 located at the capsule recognition position while the source of light 82 of the capsule recognition module 8 is switched off, i.e. while the surface of the capsule 3 at the capsule recognition position is lit by the ambient light only. Preferably, except for the lighting, the conditions while determining the correction value are the same as the conditions while determining the at least one sample value. In particular, the correction value and the at least one sample value are sampled while the capsule is in the same position relative to the optical sensor 81, preferably in the capsule recognition position.

The correction value is used to correct the at least one sample value into at least one corrected sample value that is representative of the optical property of the sampled capsule 3 under the effects of the light emitted by the source of light 82 only, i.e. without the effects of the ambient light.

The corrected sample value is for example calculated by subtracting the correction value from the sample value or from an average of sample values representative of the same capsule 3. Other methods of calculating the corrected sample value are however possible within the frame of the invention, depending for example on the nature of the optical property, the unit or value characterizing the optical property, etc.

Figure 11:
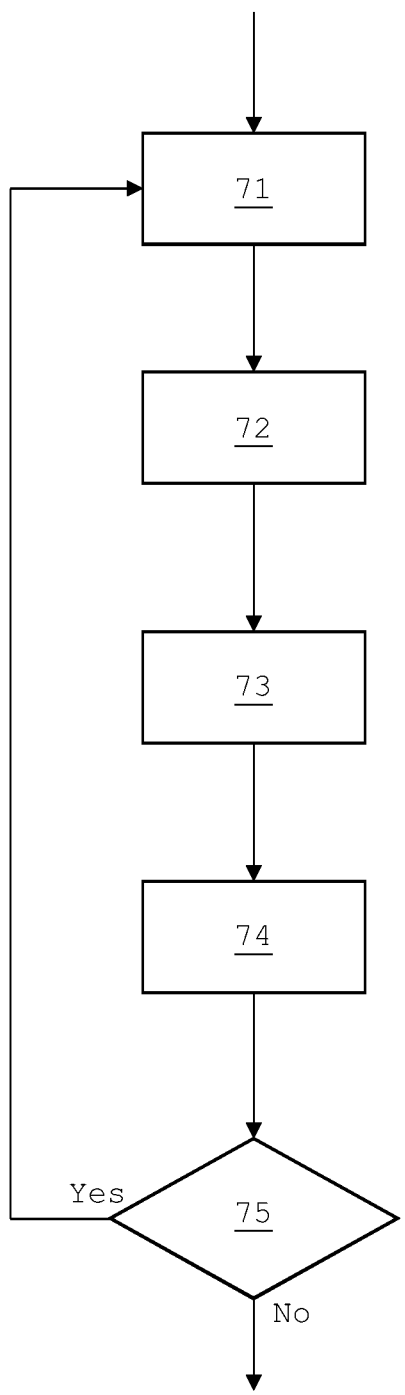
FIG. 11 is a block diagram illustrating the process of calibrating the capsule recognition module according to the invention.

According to a preferred embodiment of the capsule recognition process of the invention that is schematically illustrated in the diagram of FIG. 11, the correction value is determined in a first step 71. Accordingly, once a capsule is positioned in the capsule recognition position and the capsule recognition process is launched, either automatically by a signal of the detection sensor or manually through actuation by a user of the machine's user interface, the optical sensor of the capsule recognition module senses the corresponding optical property of the capsule while the source of light is switched off, thereby determining the correction value. In a second step 72, the source of light is switched on and the optical sensor senses the capsule's same optical property, thereby determining at least one sample value of the capsule's optical property. In the second step 72, the optical sensor preferably successively senses the optical property of the capsule at least twice, for example three times, for example in a burst. The at least two, for example three sample values thus determined are then preferably compared to each other in order to detect a possible variation in the sensing conditions during the sample value measurement burst, which may be indicative of an unstable capsule and/or of rapidly changing ambient conditions, in particular ambient lighting conditions, which may result in a wrong result of the capsule recognition process. If the variation within the sample values is higher than a predetermined threshold, then the sample values are for example disregarded and the capsule recognition process is interrupted and possibly repeated from the start. If the variation is lower than or equal to the predetermined threshold, then one of the sample values is used as sample value resulting from the sensing step, or the sample values are averaged and the average is used as the sample value resulting from the sensing step. The corrected sample value is then calculated for example by subtracting the correction value from the resulting sample value. Alternatively, each sample value of the same capsule is corrected by the correction value and then averaged with the other corrected sample values of the same capsule.

The resulting corrected sample value is then used in step 73 to determine a type of the sensed capsule on the basis of reference values, as explained above.

Optionally, the optical property of the capsule is sensed again with the source of light switched off at a step 74 of the capsule recognition process. The thus determined control value is compared with the correction value captured in the first step 71 in order to determine whether the ambient lighting conditions remained stable during the capsule recognition process or not.

If the ambient light changed significantly between the beginning and the end of the recognition process, i.e. if the difference between the correction value and the control value is above a predefined threshold, then the capsule recognition process is preferably repeated from the first step 71 in order to avoid errors that might be induced by the change in the lighting conditions.

If no significant changes to the ambient light took place between the beginning of the capsule recognition process and the end thereof, i.e. if the difference between the correction value and the control value is below the predefined threshold, then the type of capsule determined during the capsule recognition process is considered as correct with a high probability and thus used by the machine's controller to control the beverage preparation process using the recognized capsule.

Alternatively, the step 73 of determining a type of capsule is performed after the step 75 of determining whether the ambient light significantly changed during the capsule recognition process. Thus if the answer is positive, i.e. if the ambient light changed significantly and the capsule recognition process must be reinitiated for the same capsule, unnecessary operations of comparing a probably irrelevant corrected sample value with the reference values can be spared. Similarly, correcting the at least one sample value with the correction value may be performed after the determination step 75 for the same reasons.

The invention claimed is:

1. A machine for preparing and dispensing a beverage comprising:
    an extraction unit for extracting the beverage from a beverage ingredient capsule;
    a control unit for controlling the extraction unit to extract the beverage from the beverage ingredient capsule;
    an outlet for dispensing the beverage formed from the beverage ingredient capsule to a user-receptacle located in a receptacle placing area; and
    a capsule recognition module for recognizing a type of the beverage ingredient capsule inserted in the machine, the capsule recognition module comprising:
    a light source for lighting at least part of a surface of the beverage ingredient capsule; and
    an optical sensor for sensing an optical property of the at least part of the surface of the beverage ingredient capsule,
    the capsule recognition module is configured to:
        determine a correction value of the optical property by sensing the optical property of the at least part of the surface of the beverage ingredient capsule while the light source is switched off;
        determine at least one sample value of the optical property by sensing the optical property of the at least part of the surface of the beverage ingredient capsule while the light source is switched on;
        calculate a corrected sample value with the correction value and the at least one sample value; and
        determine the type of the beverage ingredient capsule by comparing the corrected sample value with at least one reference value, the at least one reference value being representative of a type of capsule.

2. The machine of claim 1, wherein the capsule recognition module is configured to calculate the corrected sample value by subtracting the correction value from the at least one sample value.

3. The machine of claim 1, wherein the capsule recognition module is configured to successively determine three sample values of the at least part of the surface of the beverage ingredient capsule while the light source is switched on and to calculate the corrected sample value by calculating an average of the three sample values and subtracting the correction value from the average.

4. The machine of claim 1, wherein the capsule recognition module is configured to determine the correction value in a first step and to determine the at least one sample value in a second step, the capsule recognition module being further configured to:
   in a step subsequent to the second step, determine a control value of the optical property by sensing the optical property of the at least part of the surface of the beverage ingredient capsule while the light source is switched off;
   calculate a difference between the control value and the correction value;
   if the difference is equal or above a predefined threshold, discard the previously determined at least one sample value and start the capsule recognition process again at the first step; and
   if the difference is below the predefined threshold, transmit the determined type of such the beverage ingredient capsule to the control unit.

5. The machine of claim 1, wherein the optical property is a colour of the beverage ingredient capsule and wherein the at least one sample values and at least one reference value are vectors characterizing the colour.

6. The machine of claim 5, wherein the capsule recognition module is configured to determine a type of the beverage ingredient capsule by computing an Euclidian distance between the corrected sample value and at least one reference value, the at least one reference value being representative of a type of capsule.

7. The machine of claim 1, further comprising a capsule recognition position.

8. The machine of claim 1, further comprising a capsule detector for detecting a presence of the beverage ingredient capsule located on or approaching a capsule feeder of the machine and triggering capsule recognition by the capsule recognition module.

9. The machine of claim 8, further comprising a material detector for recognising a material of the beverage ingredient capsule located on or approaching the capsule feeder of the machine.

10. A combination of a machine for preparing and dispensing a beverage, the machine comprising:
   an extraction unit for extracting the beverage from a beverage ingredient capsule;
   a control unit for controlling the extraction unit to extract the beverage from the beverage ingredient capsule;
   an outlet for dispensing the beverage formed from the beverage ingredient capsule to a user-receptacle located in a receptacle placing area; and
   a capsule recognition module for recognizing a type of the beverage ingredient capsule inserted in the machine, the capsule recognition module comprising:
   a light source for lighting at least part of a surface of the capsule; and
   an optical sensor for sensing an optical property of the at least part of the surface of the beverage ingredient capsule,
   the capsule recognition module is configured to:
   determine a correction value of the optical property by sensing the optical property of the at least part of the surface of the beverage ingredient capsule while the light source is switched off;
   determine at least one sample value of the optical property by sensing the optical property of the at least part of the surface of the beverage ingredient capsule while the light source is switched on;
   calculate a corrected sample value with the correction value and the at least one sample value; and
   determine the type of the beverage ingredient capsule by comparing the corrected sample value with at least one reference value, the at least one reference value being representative of a type of capsule; and
   the beverage ingredient capsule, the beverage ingredient capsule being in an extraction chamber of the machine.

11. A method of preparing and dispensing a beverage from a beverage ingredient capsule in a machine, the method comprising:
   inserting the beverage ingredient capsule in the machine;
   determining a correction value of an optical property of at least part of a surface of the beverage ingredient capsule by sensing with an optical sensor the optical property while a light source is switched off;
   determining at least one sample value of the optical property by sensing the optical property of the at least part of the surface of the capsule while the light source is switched on;
   calculating a corrected sample value with the correction value and the at least one sample value; and
   determining a type of the beverage ingredient capsule by comparing the corrected sample value with at least one reference value, the at least one reference value being representative of a type of capsule.

12. The method of claim 11, wherein the corrected sample value is calculated by subtracting the correction value from the at least one sample value.

13. The method of claim 11, wherein the step of determining at least one sample value comprises successively determining three sample values of the at least part of the surface of the beverage ingredient capsule while the light source is switched on and to calculate the corrected sample value by calculating an average of the three sample values and subtracting the correction value from the average.

14. The method of claim 11, wherein the step of determining the correction value is performed in a first step and the step of determining the at least one sample value is performed in a second step, the method further comprising:
   in a step subsequent to the second step, determining a control value of the optical property by sensing the optical property of the at least part of the surface of the beverage ingredient capsule while the light source is switched off; and
   calculating a difference between the control value and the correction value; and
   if the difference is equal or above a predefined threshold, discarding the previously determined at least one sample value and starting the capsule recognition process again at the first step; and
   if the difference is below the predefined threshold, transmitting the determined type of the beverage ingredient capsule to a control unit.

* * * * *